(12) United States Patent
Wieckhorst et al.

(10) Patent No.: US 10,631,460 B2
(45) Date of Patent: Apr. 28, 2020

(54) AGRICULTURAL WORKING MACHINE

(71) Applicant: CLAAS Tractor SAS,
Vélizy-Villacoublay (FR)

(72) Inventors: Jan Carsten Wieckhorst, Paderborn
(DE); Christian Ehlert, Bielefeld (DE)

(73) Assignee: CLAAS Tractor SAS,
Vélizy-Villacoublay (FR)

( * ) Notice: Subject to any disclaimer, the term of this patent is extended or adjusted under 35 U.S.C. 154(b) by 189 days.

(21) Appl. No.: 15/712,570

(22) Filed: Sep. 22, 2017

(65) Prior Publication Data

US 2018/0084722 A1    Mar. 29, 2018

(30) Foreign Application Priority Data

Sep. 28, 2016  (DE) .................. 10 2016 118 283

(51) Int. Cl.
*A01D 41/127* (2006.01)
*B60W 40/064* (2012.01)
(Continued)

(52) U.S. Cl.
CPC ....... *A01D 41/1274* (2013.01); *B60W 40/064* (2013.01); *B60W 40/068* (2013.01);
(Continued)

(58) Field of Classification Search
CPC combination set(s) only.
See application file for complete search history.

(56) References Cited

U.S. PATENT DOCUMENTS

| 5,916,298 A | 6/1999 | Kroiss et al. |
|---|---|---|
| 8,370,742 B2 | 2/2013 | Hieronymus et al. |

(Continued)

FOREIGN PATENT DOCUMENTS

| DE | 10 2006 044 159 A1 | 4/2008 |
|---|---|---|
| DE | 11 2012 000 425 T5 | 10/2013 |

(Continued)

OTHER PUBLICATIONS

English Translation of DE102006044159 A1.*
European Search Report for EP Patent Application No. 17171201 dated Nov. 9, 2017, 8 pages.

*Primary Examiner* — Rami Khatib
(74) *Attorney, Agent, or Firm* — Lempia Summerfield Katz LLC

(57) ABSTRACT

An agricultural work machine and a method for operating an agricultural work machine are disclosed. The agricultural work machine includes a driver assistance system, which comprises a memory for storing data, a computing device for processing the data stored in the memory, and a graphical interface. The computing device graphically displays an operating data field via the graphical interface, which represents a display range for a first operating parameter, and the current value for the first operating parameter in the operating data field. The computing device evaluates the first operating parameter over a portion of the display range according to an evaluation criterion that relates to a second operating parameter, evaluates the first operating parameter based on a relationship between the first operating parameter and the second operating parameter contained in a characteristic diagram system, and graphically displays the evaluation data determined in this manner in the operating data field.

18 Claims, 3 Drawing Sheets

(51) Int. Cl.
*B60W 50/08* (2020.01)
*B60W 40/10* (2012.01)
*B60W 40/068* (2012.01)
*B60W 50/14* (2020.01)

(52) U.S. Cl.
CPC ...... *B60W 40/1005* (2013.01); *B60W 50/085* (2013.01); *B60W 2050/143* (2013.01); *B60W 2050/146* (2013.01); *B60W 2300/15* (2013.01); *B60W 2520/26* (2013.01); *B60W 2530/10* (2013.01); *B60W 2530/20* (2013.01); *B60W 2550/14* (2013.01); *B60W 2550/141* (2013.01); *B60W 2550/142* (2013.01); *B60W 2550/143* (2013.01); *B60W 2550/148* (2013.01); *B60Y 2200/20* (2013.01); *B60Y 2200/22* (2013.01); *B60Y 2200/221* (2013.01)

(56) References Cited

U.S. PATENT DOCUMENTS

| | | | |
|---|---|---|---|
| 8,670,885 B2 | 3/2014 | Gilman et al. | |
| 8,755,994 B2 | 6/2014 | Gilman et al. | |
| 2005/0026662 A1* | 2/2005 | Fechner | A01D 41/1271 460/1 |
| 2006/0025917 A1* | 2/2006 | Pandey | B60K 6/46 701/82 |
| 2010/0125788 A1* | 5/2010 | Hieronymus | A01D 41/127 715/702 |
| 2012/0004813 A1* | 1/2012 | Baumgarten | A01D 41/127 701/50 |
| 2012/0179318 A1 | 7/2012 | Gilman et al. | |
| 2012/0179319 A1 | 7/2012 | Gilman et al. | |
| 2014/0129048 A1* | 5/2014 | Baumgarten | G06Q 10/04 701/1 |
| 2014/0343802 A1 | 11/2014 | Pichlmaier | |
| 2018/0196441 A1* | 7/2018 | Muench | A01D 41/127 |

FOREIGN PATENT DOCUMENTS

| | | |
|---|---|---|
| EP | 2186394 B1 | 3/2013 |
| WO | WO2013013917 A1 | 1/2013 |

\* cited by examiner

AGRICULTURAL WORKING MACHINE

CROSS REFERENCE TO RELATED APPLICATION

This application claims priority to German Patent Application No. DE 102016118283.4, filed Sep. 28, 2016, the entire disclosure of which is hereby incorporated herein by reference.

TECHNICAL FIELD

This application relates generally to an agricultural work machine a method for operating the agricultural work machine, and more specifically relates to a system and method that uses a driver assistance system to predict the effects of changes in operating parameters.

BACKGROUND

There are several types of agricultural work machines equipped with a driver assistance system and execute an agricultural work process. Example agricultural work machines include: tractors; self-propelled harvesters (e.g., forage harvesters, combine harvesters); etc. Of importance is the optimal setting of the operating parameters that determine the current operating state of the work machine. Depending on the application, there may be a number of operating parameters, which have non-linear relationships to one another. In this regard, it may be difficult to set the optimal operating parameters.

One agricultural work machine is disclosed in EP 2 186 394 B1, which includes a driver assistance system with a graphical user interface, via which the respective current operating state is graphically depicted. In particular, the graphical depiction shows the degree of deviation of an operating parameter from its optimal value.

BRIEF DESCRIPTION OF THE DRAWINGS

The accompanying drawings, which are incorporated in and constitute a part of this specification, illustrate various aspects of the invention and together with the description, serve to explain its principles. Wherever convenient, the same reference numbers will be used throughout the drawings to refer to the same or like elements.

DETAILED DESCRIPTION OF EMBODIMENTS

Figure 1:
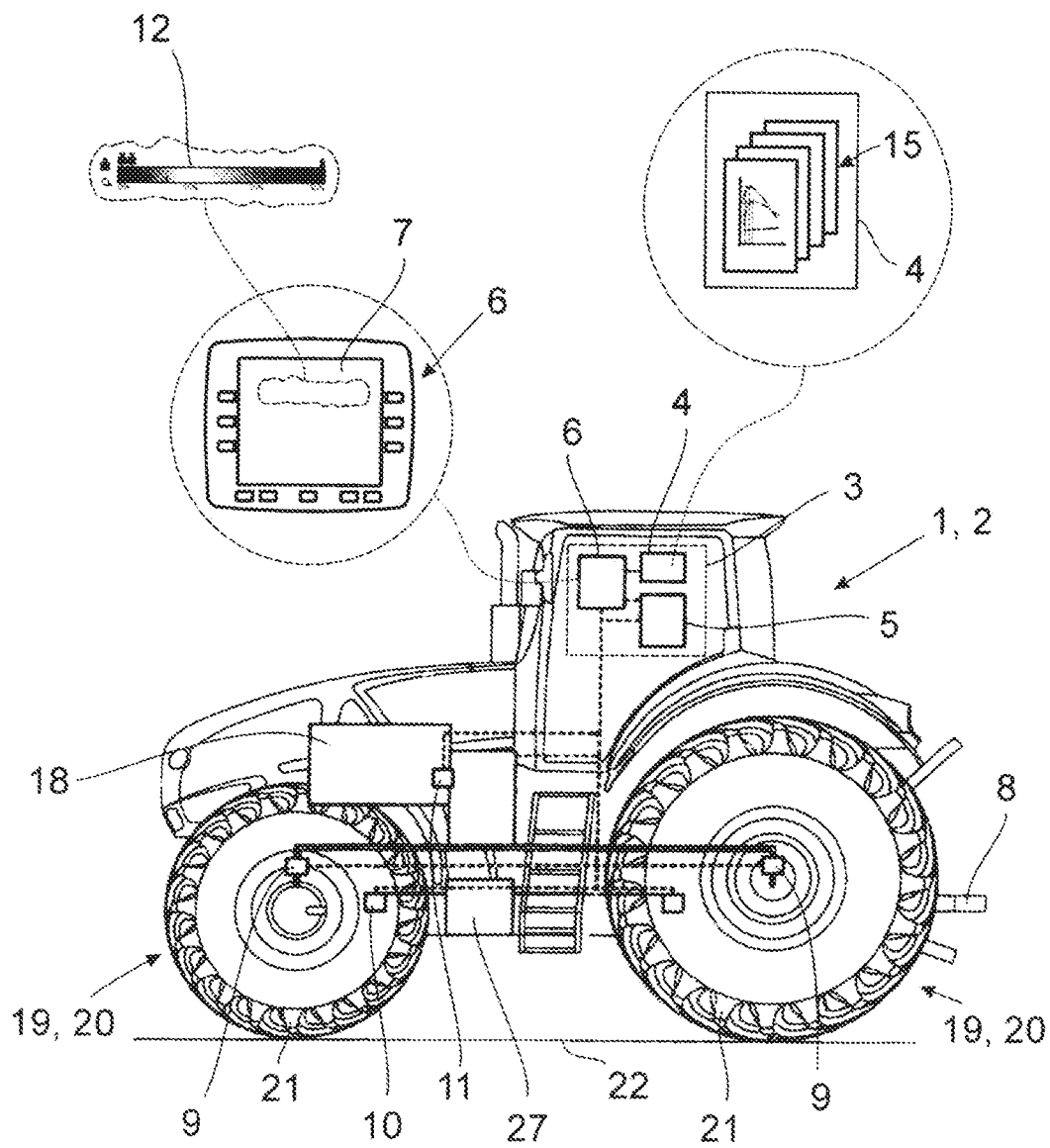
FIG. 1 illustrates a schematic illustration of an agricultural work machine according to one implementation.

As discussed above, agricultural machines may include a graphical user interface that depicts the degree of variation of an operating parameter from its optimal value. However, this graphical depiction does not provide the user with any information regarding the extent to which a change in the operating parameter has an effect on the overall optimization results. In this regard, this depiction limits predicting the effects of a user-side change in the operating parameters.

In one implementation, an agricultural work machine and a method for operating the agricultural work machine is disclosed which better predicts the effects of a user-side change in operating parameters.

In a specific implementation, the agricultural work machine includes a driver assistance system with a computing device, whereby the computing device is configured to determine the respective current operating state or operating point while executing the work process, and configured to output via the graphical user interface an operating data field that represents a display range for a first operating parameter. In this regard, the computing device is in communication with the graphical user interface. In one implementation, the display range is based on a range of values for the first operating parameter. For example, the display range may comprise an entire range of possible values for the first operating parameter. As another example, the display range may comprise a subset of the entire range of possible values for the first operating parameter. In this regard, the computing device may first determine a range of values for the first operating parameter, and then evaluate the first operating parameter over the display range, which may be part or all of the range of possible values. In one implementation, the computing device may have a predefined range of values for the first operating parameter.

Furthermore, the current value for the first operating parameter is also graphically depicted in the operating data field of the graphical user interface. Up to this point, this corresponds to the graphical depiction of an operating parameter known per se.

In one implementation, the operating field of the graphical user interface depicts an evaluation of the first operating parameter over at least a portion of the display range (e.g., the range of values). In this manner, the user is provided with an idea as to the effects a change in the first operating parameter may have by examining the operating data field.

The evaluation of the first operating parameter may be based on an evaluation criterion. In one implementation, the evaluation criterion may comprise a second operating parameter, which is related to the first operating parameter. In a specific implementation, the relationship between the first operating parameter and the second operating parameter is derived from a characteristic diagram system (e.g., an engine map system) that is or may be stored in the memory of the drive assistance system.

The computing device may evaluate the first operating parameter over at least a portion of the display range (e.g., over part or all of the range of values of the first operating parameter) according to the evaluation criterion that relates to a second operating parameter. Further, the aforementioned characteristic diagram system (e.g., the engine map system) may be stored in the memory, which contains relationships between at least a portion of the operating parameters, wherein the computing device carries out the evaluation of the first operating parameter on the basis of a relationship between the first operating parameter and the second operating parameter contained in the characteristic diagram system (e.g., contained in the engine map system). Lastly, the computing device may graphically display the evaluation data determined in this manner in the operating data field. In this manner, not only for the current value of the first operating parameter, but simultaneously, an evaluation of the first operating parameter, may be made available to the user when looking at the operating data field, over at least a portion of the display range (e.g., the range of values).

The above evaluation criterion may be selected from a broad range. Further, the selection may dictate how the evaluation data that are depicted in the operating data field are to be determined. In the simplest case, the evaluation data may simply be the respective values of the second operating parameter. However, the evaluation criterion may also contain complex calculation specifications for determining the relevant evaluation data, for example, in order to determine the respective degree of assuming optimal or critical operating points.

Other implementations may relate to a more differentiated depiction of the current operating point, such that the user is informed that a change in the first operating parameter may be achieved through a change in a third operating parameter. This is of interest if the first operating parameter cannot be changed by the user directly, but instead, can only be changed by changing a third operating parameter. Thus, the computing device may display which qualitative change to the third operating parameter will result in which qualitative change in the evaluation of the first operating parameter. In one implementation, a qualitative change may comprise whether an increase or reduction of the third operating parameter leads to an increase or reduction of the first operating parameter. In this implementation, quantitative data regarding the numerical values of the relevant operating parameters and/or evaluation data are expressly not meant with this. In an alternative implementation, quantitative data includes numerical values of the relevant operating parameters and/or evaluation data.

Alternatively, or in addition, the evaluation data may be depicted in different ways. As one example, the operating data field may be graphically stored to a certain extent with a background, which can be of different colors, color densities, color compositions, brightness, patterns, etc., depending on the content, in particular the values of the relevant evaluation data. In particular, critical operating points may be depicted in a particularly intuitive manner through the appropriate design thereof. In this regard, the presentation of the operating data field, with the background, may provide information to the user.

Other depictions and/or optimizations of the operating parameters concerning the traction of the traction drive are contemplated. Thus, these depictions and/or optimizations may play a role in the case of a work machine designed as a tractor. High traction forces may frequently be necessary, in particular when it is a matter of cultivation of the soil, such as plowing. In this case, the user may be required to set operating parameters such as tire pressure or ballasting, such that resulting operating parameters, such as the traction efficiency, the traction coefficient, rolling resistance coefficient, or slippage, are optimized, depending on the application. The relationships between the operating parameters pertaining to traction may be almost entirely non-linear, and may be readily illustrated with the solution (in particular with the characteristic diagram system that may be stored in the memory).

The displaying of operating parameters may be used with a variety of work processes, with the applications explained herein merely being illustrations thereof.

Alternatively, a method for the operation of an agricultural work machine is provided. With regard to the method, reference may be made to all of the explanations regarding the agricultural work machine discussed herein, with the corresponding method of operation of the agricultural work machine.

Referring to the figures, the agricultural work machine 1 illustrated in FIG. 1 may be used to execute agricultural work processes. The work machine 1 may comprise a tractor 2, which is used, by way of example, as a towing machine. The implementations described herein may be used with all agricultural work machines specified herein, such as the agricultural work machines listed in the background. The discussion below focuses on a work machine 1 designed as a tractor 2. These implementations may likewise apply to all other types of agricultural work machines.

During the execution of the agricultural work processes, the work machine 1 is operated at an operating point defined by operating parameters (e.g., the work machine 1 may operate at the operating point defined at all times by the operating parameters). In one implementation, the term "operating parameter" refers to all of the parameters that describe the respective current state of the work machine 1. These include those operating parameters that can be changed directly by the user, e.g., by a user input. In addition, these may include those operating parameters resulting from the work process, and which may thus only be changed indirectly by the user.

Aside from the drive technology components explained in more detail below, the work machine 1 has a driver assistance system 3, comprising a memory 4 for storing data, a computing device 5 for processing the data stored in the memory 4, and a graphical user interface 6. In one implementation, the graphical user interface 6 comprises a display 7, which may be designed as a touch screen.

The computing device 5 can take the form of processing circuitry, a microprocessor or processor, and a computer-readable medium that stores computer-readable program code (e.g., software or firmware) executable by the (micro) processor, logic gates, switches, an application specific integrated circuit (ASIC), a programmable logic controller, and an embedded microcontroller, for example. The computing device 5 can be configured with hardware and/or firmware to perform the various functions described below and shown in the flow diagrams. Also, some of the components shown as being internal to the computing device 5 can also be stored external to the computing unit 90, and other components can be used.

The computing device 5 is configured to determine the respective current operating point during the execution of the work process. In one implementation, the computing device 5 may query one or more sensors, such as sensors 8, 9, 10, 11 dedicated to the work machine 1, in order to determine the operating parameter(s). For example, the sensor 8 is a traction force sensor configured to determine a traction force with which an attachment device that is to be pulled acts on the tractor 2. The sensor 9 is a wheel sensor, assigned to a drive element 19 (explained further below), and via which a rotational speed, a wheel force, a wheel torque and/or an axle load, acting on the drive element 19, can be measured. The sensor 10 is a pressure sensor, via which a tire pressure assigned to the drive element 19 can be measured. The sensor 11 is a rotational speed sensor, for determining the rotational speed of a drive shaft of the traction drive 18.

An overview of FIGS. 1 and 3A-C shows that the computing device 5 graphically depicts an operating data field 12 via the user interface 6, which represents a display range for a first operating parameter $B_1$. With the implementations depicted in FIGS. 3A-C, the operating data fields 12 are each illustrated in bar forms. Other designs are contemplated, as explained below.

The current values for the first operating parameter $B_1$ are graphically depicted in the operating data field 12, as can likewise be derived from the illustration according to FIGS.

3A-C. The graphical depiction of the first operating parameter $B_1$ is implemented here by the marking (or blip or arrow) 13 depicted in the corresponding position in the operating data field 12. The marking 13 may be illustrated as a pointer. Additionally, a scale 14 relating to the display range is assigned to the operating data field 12, via which the respective value for the first operating parameter $B_1$ can be read out. As a result, various values, such as the current value for the first operating parameter $B_1$, represented by the position of the marking 13 in the operating data field 12, can be read out in a simple manner.

In one implementation, the computing device 5 is configured to evaluate the first operating parameter $B_1$ according to an evaluation criterion over at least a portion of the display range. The evaluation criterion may relate to a second operating parameter $B_2$ that is associated with the first operating parameter $B_1$. In one implementation, the second operating parameter $B_2$ is causatively linked to the first operating parameter $B_1$. In this regard, a change to the first operating parameter $B_1$ normally also results in a change to the second operating parameter $B_2$, so that the first operating parameter $B_1$ can be evaluated according to an evaluation criterion that relates to the second operating parameter $B_2$. For this, the relationship between the first operating parameter $B_1$ and the second operating parameter $B_2$ is known. The relationship between the first operating parameter $B_1$ and the second operating parameter $B_2$ may be represented in one of several ways. As one example, a characteristic diagram system 15 (such as an engine map system) may be stored in the memory 4, which contains relationships between a least a portion of the operating parameters, such as between the first operating parameter $B_1$ and the second operating parameter $B_2$. Thus, the computing device 5 may perform the evaluation of the first operating parameter $B_1$ based on a relationship between the first operating parameter $B_1$ and the second operating parameter $B_2$ contained in the characteristic diagram system 15. The evaluation data obtained in this manner may be graphically displayed in the operating data field 12.

Figure 3A:
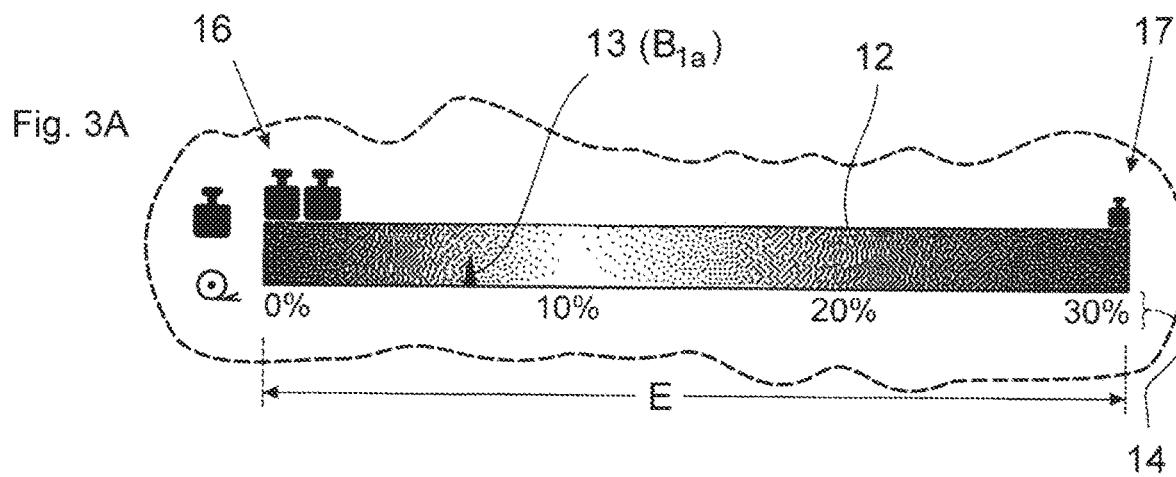
FIGS. 3A-C include graphical illustrations of operating data fields according to the proposal, to illustrate different operating parameters.
Figure 3B:
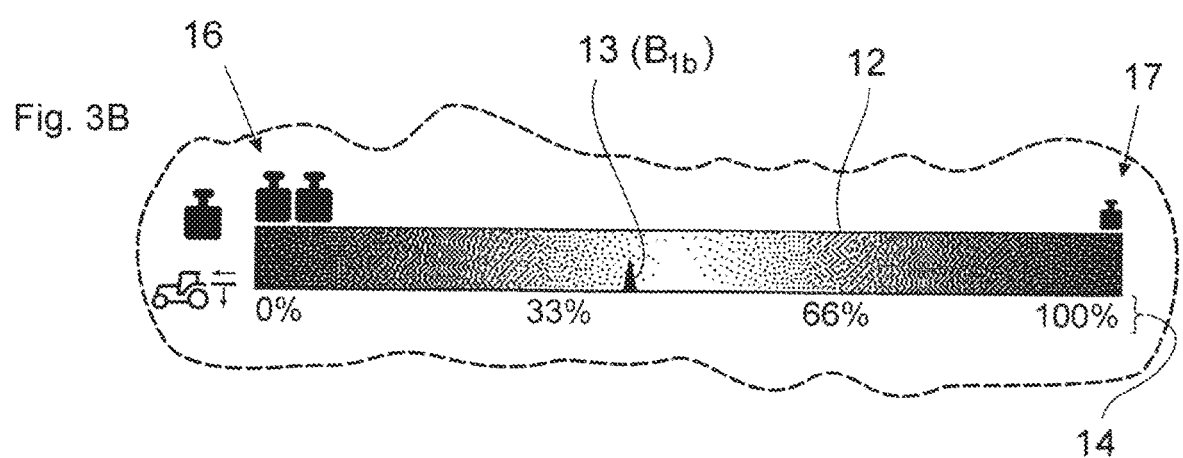
Figure 3C:
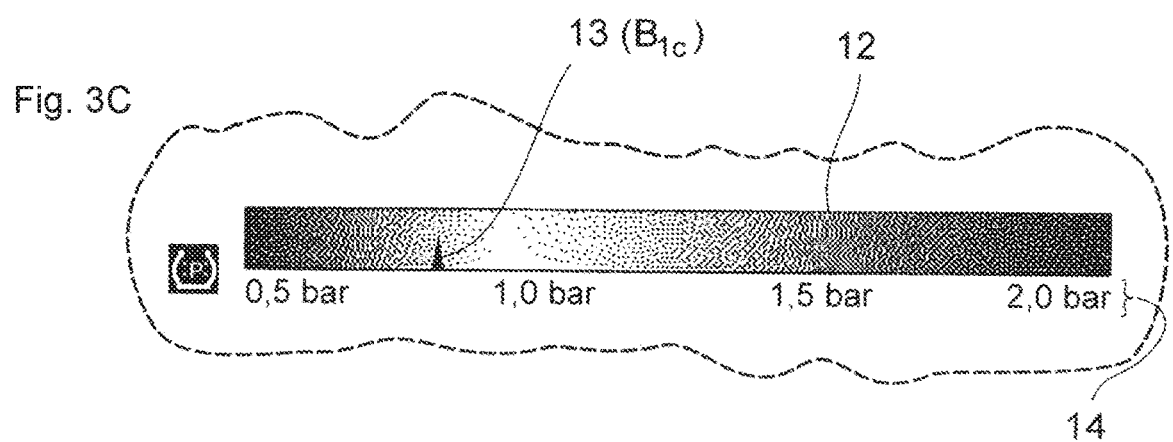

The implementations according to FIGS. 3A-C graphically display the respective value of the evaluation data in the operating data field 12 by a corresponding brightness at a position corresponding to the respective value of the first operating parameter $B_1$. This results in the brightness gradients or curves depicted in FIGS. 3A-C. The result is, as explained above, a particularly clear illustration of not only the current value of the first operating parameter $B_1$, but also a corresponding evaluation of the first operating parameter $B_1$ over the display range.

Multiple variations of the evaluation criterion, depending on the application, are contemplated. Further, the variations of the evaluation criterion may likewise stored in the memory 4. In a first implementation, the evaluation data may correspond to the respective value of the second operating parameter $B_2$ in accordance with the evaluation criterion. Alternatively, the evaluation data may correspond to the respective degree of assuming optimal or critical operating points in accordance with the evaluation criterion. A combination of these two evaluation criteria is also contemplated.

As previously stated, the operating parameters, such as the first operating parameter $B_1$ and the second operating parameter $B_2$, may be those operating parameters that cannot be changed directly by the user. In this case, a change to the first operating parameter $B_1$, and accordingly, a second operating parameter $B_2$, could potentially be achieved by changing a third operating parameter $B_3$. Thus, in one implementation, the computing device 5 may show in the operating data field that a change can be caused in the first operating parameter $B_1$ by changing a third operating parameter $B_3$. In a specific implementation, the computing device 5 is configured to determine, based on the characteristic diagram system 15 (e.g., the engine map system), what qualitative change in the third operating parameter $B_3$ leads to what qualitative change in the first operating parameter $B_1$, and displays this in the operating data field 12. With the exemplary implementations shown in FIGS. 3A-C, this information concerning the third operating parameter $B_3$ is depicted by icons 16, 17, explained further below.

It is contemplated that there may be different third operating parameters $B_3$, as set forth above, for a first operating parameter $B_1$, which can be changed in order to implement a corresponding change in the first operating parameter. Thus, in one implementation, the computing device 5 is configured to determine a third operating parameter $B_3$ from the characteristic diagram system 15. Alternatively, the computing device 5 is configured to determine a third operating parameter $B_3$ via a user input. Lastly, it is contemplated that a third operating parameter $B_3$, assigned to the first operating parameter $B_1$ in the manner described above, is stored in the memory 4 of the driver assistance system 3.

As explained above, the evaluation data are graphically displayed according to the proposal in the operating data field 12. In one implementation, all of the determined evaluation data are displayed at the same time as the first operating parameter $B_1$. A whole series of advantageous variations are conceivable for this.

In the implementations depicted in FIGS. 3A-C, the computing device 5 graphically displays the determined evaluation data at a position in the operating data field 12 corresponding to the respective value of the first operating parameter $B_1$.

In particular, the computing device 5 graphically displays the determined evaluation data according to their content. For example, the computing device 5 may display the determination evaluation data according to their values in one of a variety of ways at a position in the operating data field 12 corresponding to the respective value of the first operating parameter $B_1$. The various ways including one, some, or all of the following: by means of different display surface properties, in particular through different colors, color densities, color compositions, brightness, patterns, etc. With this type of depiction of the evaluation data using one or more display surface properties, it is possible to display the evaluation data without the need for an alphanumeric display. The essential information, specifically the manner in which the evaluation data change when the current value for the first operating parameter $B_1$ is changed, is thus depicted in a particularly intuitive manner. In particular, the targeted use of colors can further improve the intuitive understanding in this context, for example, in that critical value ranges for the first operating parameter $B_1$ are depicted in red, and optimal value ranges for the first operating parameter $B_1$ are depicted in green.

In a specific implementation, the operating data field 12 is graphically displayed as an indicator field or a display area, such as a bar. The extension E of the operating data field 12 in one direction represents the display range, wherein the first operating parameter $B_1$ is depicted, as specified above, by graphical markings 13 inside the operating data field 12. The bar-shaped design of the operating data field 12 depicted in FIGS. 3A-C is just one of numerous possible designs of the operating data field 12. By way of example, it is also contemplated to design the operating data field 12 in the manner of a characteristic curve, a pie chart, a radar chart, etc.

As explained above, the work machine 1 depicted here is a tractor 2. Accordingly, the work machine 1 is equipped with a traction drive 18 and with four drive elements 19, which may include drive wheels 20 with pneumatic tires 21. In the depicted and insofar preferred exemplary embodiment, all four drive elements 19 are propulsion drive elements, powered by the traction drive 18.

Alternatively, the drive elements 19 can also be caterpillar or drive tracks. All of the implementations concerning drive elements 19 may also be achieved accordingly with such caterpillar or drive tracks.

In one implementation, the traction between the propulsion drive elements 19, drive wheels 20, and the ground 22 is a focus for the tractor 2 normally used as a towing machine, the first operating parameter $B_1$ relates to precisely this traction between the propulsion drive elements 19 and the ground 22.

Figure 2A:
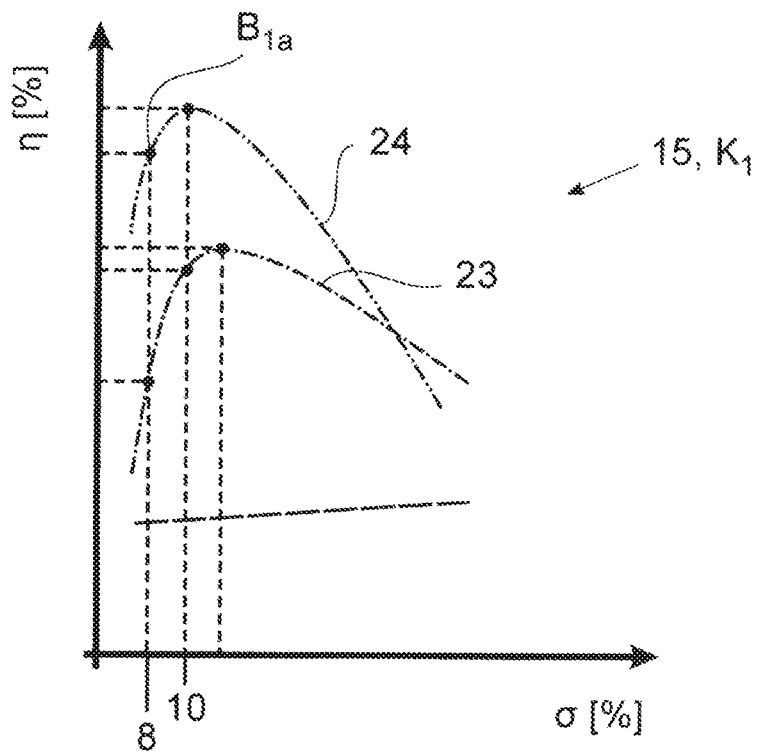
FIGS. 2A-B illustrate a characteristic diagram of at least one aspect of the system (such as engine maps) of the characteristic diagram system (such as the engine map system), with FIG. 2A illustrating the relationship between the traction efficiency/rolling resistance coefficients and the slippage, and with FIG. 2B illustrating the relationship between the traction efficiency and the slippage.
Figure 2B:
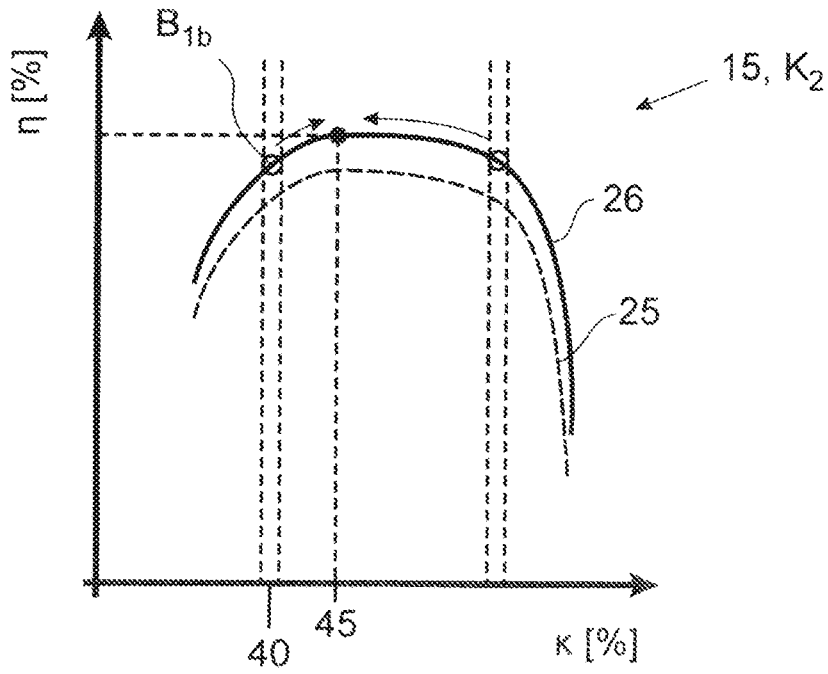

Two characteristic diagrams $K_1$, $K_2$ (such as two engine maps) are shown in FIGS. 2A-B, in which the traction of the work machine 1 in relation to the ground 22 has priority. FIG. 2A shows the characteristic diagram $K_1$ of the characteristic diagram system 15 (e.g., the engine map of the engine map system), which contains the relationship between the traction efficiency $\eta$ and the slippage $\sigma$ for different ground conditions. The traction efficiency $\eta$ relates, as is known, to the efficiency of the relevant propulsion drive elements 19, thus the relationship of the propulsion performance to the driving power applied to the propulsion drive element 19. The slippage $\sigma$ represents, in the likewise known manner, the relationship of the propulsion speed to the measured rotational speed of the respective drive surfaces of the drive elements 19.

The illustration according to FIG. 2A shows just two characteristic curves 23, 24 of the characteristic diagram $K_1$ of different ground conditions. Of note, the characteristic diagram $K_1$ shown in FIG. 2A uses entirely different characteristic curves 23, 24 depending on the respective ground conditions. Thus, the computing device 5 may be configured to draw on different characteristic diagram systems 15 (such as different engine map systems) or at least differently parameterized characteristic diagram systems 15 (such as differently parameterized engine map systems) for evaluating the first operating parameter $B_1$, depending on the respective ground conditions. The characteristic diagram $K_1$, alternatively or additionally, can be parameterized by a tire pressure of the drive element 19.

The characteristic diagram $K_2$ again shows two characteristic curves 25, 26, which are assigned to different tire pressures of the relevant drive elements 19. The characteristic diagram $K_2$ depicted in FIG. 2B shows the relationship between the traction efficiency $\eta$ and the traction coefficient $\kappa$. The traction coefficient $\kappa$ is, as is known, the relationship between the resulting propulsion force and the contact force of the drive elements 19.

It can be derived from the illustration according to FIG. 2B that an increase in the traction efficiency $\eta$ can be achieved through a reduction of the tire pressure. At the same time, the traction coefficient $\kappa$ can be increased by lowering the ballast applied to the work machine 1. As a result, the traction efficiency $\eta$ can be influenced on one hand by the tire pressure, and on the other hand, by the ballast applied via the traction coefficients $\kappa$. The characteristic diagram $K_2$, alternatively or additionally, can be parameterized by the ground conditions.

The above relationships form the basis for the variation of an operating data field 12 according to the proposal shown in FIGS. 3A-C.

In general, different specifications are contemplated for the first operating parameter $B_1$. In the implementation shown in FIG. 3A, the first operating parameter $B_1$ relates to the slippage $\sigma$ concerning the traction between the propulsion drive elements 19 and the ground 22. In contrast, the first operating parameter $B_1$ in the implementation shown in FIG. 3B relates to the traction coefficients $\kappa$ concerning the traction between the propulsion drive elements 19 and the ground 22. Alternatively, it may be provided that the first operating parameter $B_1$ relates to the traction efficiency $\eta$ concerning the traction between the propulsion drive elements 19 and the ground 22. It is also contemplated that the first operating parameter $B_1$ relates to a rolling resistance coefficient $\rho$ concerning the traction between the propulsion drive elements 19 and the ground 22.

Depending on the application, the computing device 5 is configured to determine the traction efficiency $\eta$, the traction coefficients $\kappa$, the slippage $\sigma$ or other operating parameters on the basis of sensors. Various methods may be used for this.

The first operating parameters $B_1$ referred to above are operating parameters that can only be changed indirectly by the user. Alternatively, it may be provided that the first operating parameter $B_1$ can be changed directly by the user. The first operating parameter $B_1$, here and preferably, is then for example the tire pressure of the propulsion drive elements 19. Alternatively, the first operating parameter $B_1$ can also be the ballast weight of the ballast applied to the work machine 1, the overall weight of the work machine 1, or the weight distribution of the ballast applied to the work machine 1. Accordingly, in the implementation depicted in FIG. 3C, it is provided, by way of example, that the first operating parameter $B_1$ is the tire pressure of the propulsion drive elements 19 of the work machine 1.

In the implementation shown in FIG. 3A, the first operating parameter $B_1$ is the slippage $\sigma$, as described above. It can be derived from the marking 13, looking at the scale 14, that the slippage $\sigma$ is approximately 8% at the current operating point. The second operating parameter $B_2$ relates to the traction efficiency $\eta$ in FIGS. 3A-C. The evaluation data according to the evaluation criteria correspond thereby to the respective value of the second operating parameter $B_2$, thus the traction efficiency $\eta$. This means that the slippage $\sigma$ is evaluated over the display range with respect to the traction efficiency $\eta$ associated with the respective slippage $\sigma$. The arrangement is such that the brightness at the relevant position in the operating data field 12 represents the value of the traction efficiency $\eta$. Accordingly, the maximum traction efficiency $\eta$ is located in a slippage range of approximately 10%.

FIG. 2A shows that the operating data field 12 according to FIG. 3A is derived from the characteristic diagram $K_1$ according to FIG. 2A. The computing device 5 may default to the upper characteristic curve 24 here. The selection of the characteristic curve 24 may be based on a user input concerning the ground conditions.

The characteristic curve 24 shows a maximum traction efficiency $\eta$ with a slippage of approximately 10%. The current value $B_{1a}$ of the first operating parameter $B_1$ is depicted in FIG. 2A to the left of the maximum value for the traction efficiency $\eta$. Lastly, the illustration according to FIG. 3A is thus an intuitive display for the current operating point $B_{1a}$ shown in FIG. 2A.

FIG. 3A also shows that it is possible to change the first operating parameter $B_1$ by means of the third operating parameter $B_3$, represented via the icons 16, 17. This is shown in that an icon 16 with two large weights is shown in the left-hand region, and an icon 17 with a small weight is shown in the right-hand region. This indicates to the user that a reduction in the ballast is accompanied by an increase in slippage. This can be derived in turn from the characteristic diagram $K_2$ according to FIG. 2B, according to which the traction efficiency η can be increased with a reduction of the ballast, such that, according to FIG. 2A, the optimal slippage σ of 10% can be set. In this regard, the depiction according to FIG. 3A corresponds to the characteristic diagram system 15 depicted in FIGS. 2A-B.

In the implementation according to FIG. 3B, the first operating parameter $B_1$ is the traction coefficient κ. According to FIG. 3B, the current value $B_{1b}$ for the first operating parameter $B_1$ is approximately 40%. The second operating parameter $B_2$, in turn, is the traction efficiency η in FIG. 3B, wherein the value of the evaluation data is indicated by the brightness at the relevant position in the operating data field 12. The current value $B_{1b}$ for the first operating parameter $B_1$ is shown here in FIG. 2B. From this, it is clear that a reduction in ballast, which is accompanied by an increase in the traction coefficient κ, results in the maximum traction efficiency η with a traction coefficient κ of approximately 45%. This is shown in FIG. 3B, in which the icons 16, 17 show in turn that a reduction of the ballast results in maximum traction efficiency accompanied by a slight increase in slippage σ. Accordingly, the depiction according to FIG. 3B can be derived in its entirety from the characteristic diagram system 15 according to FIGS. 2A-B.

In the implementation according to FIG. 3C, the first operating parameter $B_1$ is the tire pressure, which can be set by a tire pressure regulating system 27. FIG. 3C shows that the current value $B_{1c}$ for the first operating parameter $B_1$ there is approximately 0.8 bar. The second operating parameter $B_2$ is then the traction efficiency 11, whose value is represented accordingly via the brightness at the position in question in the operating data field 12. It can be derived from the depiction according to FIG. 3C that at this operating point, a slight increase in tire pressure is sufficient for achieving a maximum traction efficiency η. This relationship between the tire pressure and the traction efficiency η is derived from another characteristic curve, which is not shown in FIGS. 2A-B. In the implementation depicted in FIG. 3C, the first operating parameter $B_1$ is an operating parameter that can be directly changed by a user, as explained above, such that a third operating parameter $B_3$ as set forth above, is consequently not shown in FIG. 3C.

It can be derived from the explanations of the implementations shown in FIGS. 3A-C that a highest possible precision of the characteristic diagram system 15 with respect to the actually existing conditions, in particular the ground conditions here, is of particular importance.

Accordingly, it can be provided in general that the characteristic diagram system 15 is first stored in the memory 4 of the driver assistance system 3, but that it can be parameterized via user input and/or through sensors. Thus, the characteristic diagram system 15 can be adapted to the actual conditions in an iterative manner. It is however also contemplated that the characteristic diagram system 15 is stored in a database, which is available from a central server for numerous work machines 1. By way of example, it may be provided that the database provides portions of a characteristic diagram system 15 that have been obtained from a previous processing of the same area that is to be processed.

In this respect, it can also be provided that the respective characteristic diagram system 15 is updated via the respective current position of the work machine 1, which is determined, optionally, on the basis of a GPS.

Furthermore, in one implementation, two operating data fields 12, or even more than two operating data fields 12, are generated by the computing device 5 in a manner as described herein, and these can be displayed simultaneously via the graphical user interface 6. Each operating data field 12 may thus be assigned a first operating parameter $B_1$, a second operating parameter $B_2$, and potentially a third operating parameter $B_3$. With regard to the at least one further operating data field 12, reference may be made to all of the implementations disclosed herein.

In a particular implementation, the computing device 5 can be configured into a simulation mode, wherein the computing device 5 updates the at least one further operating data field 12 accordingly, in the simulation mode, on the basis of the characteristic diagram system 15, when the first operating parameter $B_1$ in an operating data field 12 is changed by a user. In this manner, it is possible to simulate, with little effort, which effects a change in the respective first operating parameter $B_1$ will have on the resulting operating point of the work machine 1. A particularly intuitive operation is obtained here, preferably in that the corresponding marking 13 in the operating data field 12 can be moved by a drag-and-drop procedure, in order to simulate a change in the first operating parameter $B_1$.

In the implementations according to FIGS. 3A-C, it is further contemplated that with a user-side change in the first operating parameter $B_1$ in an operating data field 12, e.g., through a drag-and-drop procedure, this first operating parameter $B_1$ is also changed by the machine, directly or indirectly. As an example of such a direct change, the user-side adjustment of the tire pressure in a corresponding operating data field 12 triggers an actual adjustment of the tire pressure in the drive wheels 20. In this manner, the depicted operating parameter $B_1$ can be changed in a particularly intuitive manner.

In another implementation, one or more threshold values are also depicted in the operating data field 12, and when the first operating parameter $B_1$ approaches and/or exceeds or falls below these threshold values, a visual and/or acoustic alarm is triggered. These threshold values may be stored in the memory 4 of the driver assistance system 3.

According to another implementation, a method is claimed for the operation of an agricultural work machine according to the implementations disclosed herein.

Thus, the computing device 5 may be configured to evaluate the first operating parameter $B_1$ over at least a portion of the display value range according to an evaluation criterion relating to a second operating parameter $B_2$. Further, a characteristic diagram system 15 can be stored in the memory 4, which contains relationships between at least a portion of the operating parameters, and the computing device 5 executes the evaluation of the first operating parameter $B_1$ based on a relationship between the first operating parameter $B_1$ and the second operating parameter $B_2$ contained in the characteristic diagram system 15. Lastly, the evaluation data determined in this manner are graphically displayed in the operating data field. In this regard, reference may be made to all of the explanations regarding the operation of the work machine 1 disclosed herein.

The operating parameters may be depicted in a simple and straightforward manner. In particular, the depiction of the operating parameters may be modularized with respect to the characteristic diagram system 15 (e.g., the engine map system) serving as the basis for the evaluation. In particular, the computing device 5 may be configured to determine the first operating parameter $B_1$, the second operating parameter $B_2$, and if applicable, the third operating parameter $B_3$, depending on the work process, and graphically display the operating data field 12 based on these definitions, evaluates the first operating parameter $B_1$, and graphically displays the determined evaluation data in the operating data field 12. In the simplest case, the work process is input via the user interface 6.

Alternatively or additionally, the computing device 5 may be configured to determine or parameterize the characteristic diagram system (e.g., the engine map system) depending on the work process, such as selecting one of a number of characteristic diagram systems (e.g., engine map systems) stored in the memory 4. Here as well, the selection of the work process can be made by the user, such as via the user interface 6.

Finally, the solution disclosed herein may be used on a nearly unlimited number of work processes.

Another exemplary work process is the operation of a baler, such as a square baler. In this case, the applied pressure may be optimized with respect to the resulting bale density. Accordingly, the first operating parameter $B_1$ can be the applied pressure for the operating data field 12, and the second operating parameter $B_2$ can be the resulting bale density.

Another exemplary work process is the operation of a seeder for precision seeding. In this case, the working speed, for example, may be optimized with respect to the resulting planting precision. Accordingly, the first operating parameter $B_1$ can be the working speed for the operating data field 12, and the second operating parameter $B_2$ can be the resulting planting precision.

Another exemplary work process is the operation of an internal combustion engine of an agricultural work machine. In this case, a first machine parameter, e.g. the motor rotational rate, may be optimized with respect to a second machine parameter, e.g. the resulting specific fuel consumption. Accordingly, the first operating parameter $B_1$ can be the motor rotational rate for the operating data field 12, and the second operating parameter $B_2$ can be the resulting specific fuel consumption.

Lastly, another exemplary work process is the operation of a harvester. In this case, an area output may be optimized with respect to the land use. Accordingly, the first operating parameter $B_1$ can be the area output for the operating data field 12, and the second operating parameter $B_2$ can be the resulting land use.

It is intended that the foregoing detailed description be understood as an illustration of selected forms that the invention can take and not as a definition of the invention. It is only the following claims, including all equivalents, that are intended to define the scope of the claimed invention. Finally, it should be noted that any aspect of any of the preferred embodiments described herein can be used alone or in combination with one another.

LIST OF REFERENCE SYMBOLS

1 work machine
2 tractor
3 driver assistance system
4 memory
5 computing device
6 user interface
7 display
8 traction force sensor
9 radar sensor
10 pressure sensor
11 rotational speed sensor
12 operating data field
13 marking
14 scale
15 characteristic diagram system (e.g., engine map system)
16 icon
17 icon
18 traction drive
19 drive element
20 drive wheels
21 pneumatic tires
22 ground
23, 24 characteristic curves
25, 26 characteristic curves
27 tire pressure regulating system
$B_1$, $B_2$, $B_3$ operating parameters
$K_1$, $K_2$ characteristic diagram (e.g., engine map)
$\kappa$ traction coefficient
$\eta$ traction efficiency
$\sigma$ slippage
$\rho$ rolling resistance coefficient

The invention claimed is:

1. An agricultural work machine configured to execute an agricultural work process and configured to operate at an operating point defined by operating parameters, the agricultural work machine comprising:
   a traction drive;
   at least two propulsion drive elements which are powered by the traction drive to generate traction on a ground; and
   a driver assistance system comprising:
      a memory configured to store a first operating parameter, a second operating parameter, and a characteristic diagram system, the first operating parameter relating to the traction between the at least two propulsion drive elements and the ground, the characteristic diagram system comprising a relationship between the first operating parameter and the second operating parameter;
      a graphical user interface;
      a computing device in communication with the memory and the graphical user interface, the computing device configured to:
         determine an operating point while the agricultural work process is being executed;
         determine a range of values for the first operating parameter;
         generate evaluation data, based on the characteristic diagram system, for the first operating parameter over at least a portion of the range of values;
         evaluate the first operating parameter over at least a portion of a display range according to an evaluation criterion that relates to the second operating parameter, the display range being based on the range of values; and
         graphically display via the graphical user interface:
            an operating data field that represents the display range for the first operating parameter;
            a current value for the first operating parameter in the operating data field; and
            the evaluation data, wherein the characteristic diagram system includes a characteristic diagram that contains a relationship between a traction coefficient and slippage for different ground conditions; and
wherein the first operating parameter comprises at least one of:
the slippage between at least the propulsion drive elements and the ground;
the traction coefficient relating to the traction between the propulsion drive elements and the ground; or
a rolling resistance coefficient relating to the traction between the at least two propulsion drive elements and the ground.

2. The agricultural work machine according to claim 1, wherein the evaluation data in accordance with the evaluation criterion correspond to a value of the second operating parameter.

3. The agricultural work machine according to claim 1, wherein the memory is configured to store an optimal operating point for the agricultural work machine; and
wherein the computing device is configured to generate the evaluation data in accordance with the evaluation criterion based on operating at the optimal operating point.

4. The agricultural work machine according to claim 1, wherein the computing device is further configured to:
determine, based on the characteristic diagram system, which change in a third operating parameter leads to which change in the first operating parameter; and
graphically display via the graphical user interface in the operating data field the change to the first operating parameter by changing the third operating parameter.

5. The agricultural work machine according to claim 1, wherein the computing device is configured to:
select a display surface property, from a plurality of different display surface properties, based on a value of the evaluation data; and
graphically display the evaluation data using the selected display surface property at a position in the operating data field corresponding to a value of the first operating parameter in order to graphically distinguish different values of evaluation data with different display surface properties.

6. The agricultural work machine according to claim 5, wherein the different display surface properties comprises at least one of different colors, color densities, color compositions, brightness, or patterns corresponding to the value of the first operating parameter.

7. The agricultural work machine according to claim 1, wherein the computing device is configured to graphically display the operating data field as a bar, an extension of which in one direction represents the display range, and in that the first operating parameter is displayed as a graphical marking inside the operating data field.

8. The agricultural work machine according to claim 1, wherein the first operating parameter is a slippage relating to traction between the propulsion drive elements and the ground; and
wherein the second operating parameter is traction efficiency relating to the traction between the propulsion drive elements and the ground.

9. The agricultural work machine according to claim 1, wherein the first operating parameter is a traction coefficient relating to traction between the propulsion drive elements and the ground, and
wherein the second operating parameter is traction efficiency relating to the traction between the propulsion drive elements and the ground.

10. The agricultural work machine according to claim 1, wherein a third operating parameter relates to a ballast applied to the agricultural work machine.

11. An agricultural work machine configured to execute an agricultural work process and configured to operate at an operating point defined by operating parameters, the agricultural work machine comprising:
a traction drive;
at least two propulsion drive elements which are powered by the traction drive to generate traction on a ground; and
a driver assistance system comprising:
a memory configured to store a first operating parameter, a second operating parameter, and a characteristic diagram system, the first operating parameter relating to the traction between the at least two propulsion drive elements and the ground, the characteristic diagram system comprising a relationship between the first operating parameter and the second operating parameter;
a graphical user interface;
a computing device in communication with the memory and the graphical user interface, the computing device configured to:
determine an operating point while the agricultural work process is being executed;
determine a range of values for the first operating parameter;
generate evaluation data, based on the characteristic diagram system, for the first operating parameter over at least a portion of the range of values;
evaluate the first operating parameter over at least a portion of a display range according to an evaluation criterion that relates to the second operating parameter, the display range being based on the range of values; and
graphically display via the graphical user interface:
an operating data field that represents the display range for the first operating parameter;
a current value for the first operating parameter in the operating data field; and
the evaluation data,
wherein the characteristic diagram system includes a characteristic diagram that contains the relationship between traction efficiency and traction coefficients for different tire pressures; and
wherein the first operating parameter comprises at least one of:
the traction efficiency relating to the traction between the propulsion drive elements and the ground;
the traction coefficient relating to the traction between the propulsion drive elements and the ground; or
a rolling resistance coefficient relating to the traction between the at least two propulsion drive elements and the ground.

12. An agricultural work machine configured to execute an agricultural work process and configured to operate at an operating point defined by operating parameters, the agricultural work machine comprising:
a traction drive;
at least two propulsion drive elements which are powered by the traction drive to generate traction on a ground; and a driver assistance system comprising:
a memory configured to store a first operating parameter, a second operating parameter, and a characteristic diagram system, the first operating parameter relating to the traction between the at least two propulsion drive elements and the ground, the characteristic diagram system comprising a relationship between the first operating parameter and the second operating parameter;
a graphical user interface;
a computing device in communication with the memory and the graphical user interface, the computing device configured to:
determine an operating point while the agricultural work process is being executed;
determine a range of values for the first operating parameter;
generate evaluation data, based on the characteristic diagram system, for the first operating parameter over at least a portion of the range of values;
evaluate the first operating parameter over at least a portion of a display range according to an evaluation criterion that relates to the second operating parameter, the display range being based on the range of values; and
graphically display via the graphical user interface:
an operating data field that represents the display range for the first operating parameter;
a current value for the first operating parameter in the operating data field; and
the evaluation data,
wherein the first operating parameter comprises at least one of:
a tire pressure of the at least two propulsion drive elements;
a ballast weight of a ballast applied to the agricultural work machine; or
a weight distribution of the ballast applied to the agricultural work machine.

13. The agricultural work machine according to claim 12, wherein the first operating parameter is tire pressure of the propulsion drive elements and
wherein the second operating parameter is traction efficiency relating to the traction between the propulsion drive elements and the ground.

14. A method for operation of an agricultural work machine, the agricultural work machine operated in order to execute an agricultural work process at an operating point defined by operating parameters, wherein the agricultural work machine includes a traction drive, at least two propulsion drive elements which are powered by the traction drive to generate traction on a ground, and a driver assistance system, which comprises a memory for storing data, a computing device for processing the data stored in the memory, and a graphical user interface, the graphical user interface comprising a touchscreen, the method comprising:
determining, by the computing device, a current operating point during an execution of the agricultural work process;
determining, by the computing device, a range of values for a first operating parameter, the first operating parameter relating to the traction between the at least two propulsion drive elements and the ground;
accessing a characteristic diagram system in the memory, the characteristic diagram system comprising a relationship between the first operating parameter and a second operating parameter;
generating, by the computing device, evaluation data, based on the characteristic diagram system, for a first operating parameter over at least a portion of the range of values;
evaluating, by the computing device, the first operating parameter over at least a portion of a display range according to an evaluation criterion that relates to a second operating parameter, the display range being based on the range of values;
graphically displaying via the graphical user interface:
an operating data field that represents the display range for the first operating parameter;
a current value for the first operating parameter in the operating data field; and
the evaluation data; and
receiving, via the touchscreen, input from an operator,
wherein the characteristic diagram system includes a characteristic diagram that contains a relationship between a traction coefficient and slippage for different ground conditions; and
wherein the first operating parameter comprises at least one of:
the slippage between at least the propulsion drive elements and the ground;
the traction coefficient relating to the traction between the propulsion drive elements and the ground; or
a rolling resistance coefficient relating to the traction between the at least two propulsion drive elements and the ground.

15. The method according to claim 14, wherein the computing device:
determines the first operating parameter and the second operating parameter depending on the agricultural work process;
graphically displays the operating data field based on the first operating parameter and the second operating parameter;
evaluates the first operating parameter; and
graphically displays the evaluation data in the operating data field.

16. The method according to claim 15, further comprising selecting the characteristic diagram system, depending on the agricultural work process, from a plurality of characteristic diagram systems stored in the memory.

17. The method according to claim 14, wherein the first operating parameter comprises at least one of:
a tire pressure of the at least two propulsion drive elements;
a ballast weight of a ballast applied to the agricultural work machine; or
a weight distribution of the ballast applied to the agricultural work machine.

18. A method for operation of an agricultural work machine, the agricultural work machine operated in order to execute an agricultural work process at an operating point defined by operating parameters, wherein the agricultural work machine includes a traction drive, at least two propulsion drive elements which are powered by the traction drive to generate traction on a ground, and a driver assistance system, which comprises a memory for storing data, a computing device for processing the data stored in the memory, and a graphical user interface, the graphical user interface comprising a touchscreen, the method comprising:
determining, by the computing device, a current operating point during an execution of the agricultural work process;

determining, by the computing device, a range of values for a first operating parameter, the first operating parameter relating to the traction between the at least two propulsion drive elements and the ground;

accessing a characteristic diagram system in the memory, the characteristic diagram system comprising a relationship between the first operating parameter and a second operating parameter;

generating, by the computing device, evaluation data, based on the characteristic diagram system, for a first operating parameter over at least a portion of the range of values;

evaluating, by the computing device, the first operating parameter over at least a portion of a display range according to an evaluation criterion that relates to a second operating parameter, the display range being based on the range of values;

graphically displaying via the graphical user interface:
   an operating data field that represents the display range for the first operating parameter;
   a current value for the first operating parameter in the operating data field; and
   the evaluation data; and receiving, via the touchscreen, input from an operator, wherein the characteristic diagram system includes a characteristic diagram that contains the relationship between traction efficiency and traction coefficients for different tire pressures; and wherein the first operating parameter comprises at least one of:
   the traction efficiency relating to the traction between the propulsion drive elements and the ground;
   the traction coefficient relating to the traction between the at least two propulsion drive elements and the ground; or
   a rolling resistance coefficient relating to the traction between the at least two propulsion drive elements and the ground.

* * * * *